United States Patent
Wan et al.

(10) Patent No.: US 11,025,487 B2
(45) Date of Patent: *Jun. 1, 2021

(54) SERVICE DISTRIBUTION METHOD, DEVICE AND SYSTEM

(71) Applicant: Huawei Technologies Co., Ltd., Shenzhen (CN)

(72) Inventors: Junhua Wan, Rome (IT); Wei Yue, Shenzhen (CN); Wei Wu, Shenzhen (CN); Zuoqian Jiang, Shenzhen (CN); Lei Li, Shenzhen (CN); Hai Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,255

(22) Filed: May 15, 2019

(65) Prior Publication Data

US 2019/0268225 A1     Aug. 29, 2019

Related U.S. Application Data

(63) Continuation of application No. 13/917,923, filed on Jun. 14, 2013, now Pat. No. 10,355,926, which is a (Continued)

(30) Foreign Application Priority Data

Feb. 12, 2007 (CN) .......................... 200710080120.7

(51) Int. Cl.
G06F 15/177     (2006.01)
H04L 12/24      (2006.01)
H04Q 11/00      (2006.01)

(52) U.S. Cl.
CPC ...... *H04L 41/0813* (2013.01); *H04L 41/0843* (2013.01); *H04L 41/5054* (2013.01);
(Continued)

(58) Field of Classification Search
CPC ....................... H04L 41/0813; H04L 41/5054
See application file for complete search history.

(56) References Cited

U.S. PATENT DOCUMENTS 5,832,503 A     11/1998  Malik et al.
7,876,762 B2 *  1/2011   Yang ................... H04L 12/2861
                                              370/395.3
(Continued)

FOREIGN PATENT DOCUMENTS

CN       1141546 A      1/1997
CN       1155966 A      7/1997
(Continued)

OTHER PUBLICATIONS

U.S. Appl. No. 13/917,923, filed Jun. 14, 2013.
(Continued)

*Primary Examiner* — Hua Fan
(74) *Attorney, Agent, or Firm* — Leydig, Voit & Mayer, Ltd.

(57) ABSTRACT

A service distribution method includes the steps of: firstly generating, by a management system, a corresponding configuration file from service information of a user, and sending the configuration file to an Optical Network Termination (ONT) of the user through an Optical Line Terminal (OLT); and then performing, by the ONT, corresponding configuration in accordance with the configuration file. A service distribution system and a management system are provided. The invention is applied to enable service distribution with good extendibility.

8 Claims, 2 Drawing Sheets

Related U.S. Application Data continuation of application No. 12/538,438, filed on Aug. 10, 2009, now Pat. No. 8,489,711, which is a continuation of application No. PCT/CN2007/070978, filed on Oct. 29, 2007.

(52) U.S. Cl.
CPC ...... *H04Q 11/0067* (2013.01); *H04L 41/0213* (2013.01); *H04L 41/0233* (2013.01); *H04Q 2011/0079* (2013.01)

(56) References Cited

U.S. PATENT DOCUMENTS

| | | | |
|---|---|---|---|
| 2003/0135596 | A1 | 7/2003 | Moyer et al. |
| 2005/0013314 | A1 | 1/2005 | Lim et al. |
| 2005/0117554 | A1 | 6/2005 | Blecker et al. |
| 2005/0198229 | A1 | 9/2005 | Casteel |
| 2006/0080659 | A1 | 4/2006 | Ganji |
| 2006/0256813 | A1* | 11/2006 | Brusca .............. H04L 29/12301 370/466 |
| 2008/0002718 | A1 | 1/2008 | Bernard et al. |
| 2008/0037563 | A1* | 2/2008 | Bernard .............. H04L 41/0806 370/401 |
| 2008/0253771 | A1 | 10/2008 | Noel et al. |
| 2009/0300160 | A1 | 12/2009 | Wan et al. |

FOREIGN PATENT DOCUMENTS

| | | |
|---|---|---|
| CN | 1455549 A | 11/2003 |
| CN | 1578200 A | 2/2005 |
| CN | 1625908 A | 6/2005 |
| CN | 1901464 A | 1/2007 |
| CN | 101047445 A | 10/2007 |
| CN | 101247258 B | 2/2011 |
| EP | 1087294 A2 | 3/2001 |
| EP | 1087294 A3 | 1/2006 |
| WO | 9626588 A | 8/1996 |
| WO | 9626588 A1 | 8/1996 |

OTHER PUBLICATIONS

U.S. Appl. No. 12/538,438, filed Aug. 10, 2009.
"COM4-D177-E—Requirements and Analysis for the Management Interface of Ethernet Passive Optical Networks," Study Group 4—Delayed Contribution 177, International Telecommunication Union, Geneva, Switzerland (Apr. 26-May 7, 2004).
Fellows et al., "DOCSIS-TM Cable Modem Technology," IEEE Communications Magazine, IEEE Communications Society, Institute of Electrical and Electronics Engineers, New York, New York (Mar. 2001).
"Series G: Transmission Systems and Media, Digital Systems and Networks; Digital selections and digital line system—Optical line systems for local access networks; Gigabit-capable passive optical networks (GPON): General characteristics," ITU-T Recommendation G.984.1, International Telecommunication Union, pp. 1-43, Geneva, Switzerland (Mar. 2003).
"Series G: Transmission Systems and Media, Digital Systems and Networks; Digital selections and digital line system—Optical line systems for local access networks; Gigabit-Capable Passive Optical Networks (GPON): Physical Media Dependent (PMD) Layer Specification; Amendment 1: new Appendix III—Industry best practice for 2.488 Gbit/s downstream, 1.244 Gbit/s upstream G-PON," ITU-T Recommendation G.984.2, Amendment 1, International Telecommunication Union, Geneva, Switzerland (Feb. 2006).
"Series G: Transmission Systems and Media, Digital Systems and Networks; Digital selections and digital line system—Optical line systems for local access networks; Gigabit-Capable Passive Optical Networks (GPON): Transmission Convergence Layer Specification," ITU-T Recommendation G.984.3, International Telecommunication Union, Geneva, Switzerland (Mar. 2006).
"Series G: Transmission Systems and Media, Digital Systems and Networks; Digital selections and digital line system—Optical line systems for local access networks; Gigabit-Capable Passive Optical Networks (GPON): ONT Management and Control Interface Specification; Amendment 2: Changes and extensions toteh OMCI, editorial clarifications and corrections" ITU-T Recommendation G.984.4, International Telecommunication Union, Geneva, Switzerland (Mar. 2006).
"Series G: Transmission Systems and Media, Digital Systems and Networks; Digital selections and digital line system—Optical line systems for local access networks; ONT Management and Control Interface Specification for B-PON," ITU-T Recommendation G.983.2, International Telecommunication Union, Geneva, Switzerland (Jun. 2002).
Extended European Search Report in corresponding European Patent Application No. 12000409.8, dated Apr. 2, 2012.
Extended European Search Report in corresponding European Application No. 07817169.1 dated Dec. 16, 2010.
Examination Report in corresponding Chinese Patent Application No. 200710080120.7, dated Dec. 25, 2009.
Written Opinion of the International Searching Authority in International Patent Application No. PCT/CN2007/070978, dated Feb. 14, 2008.
Office Action in corresponding Chinese Application No. 200710080120.7, dated Jun. 23, 2010.
Office Action in corresponding Chinese Application No. 200810189678.3, dated Jun. 15, 2011.

\* cited by examiner

SERVICE DISTRIBUTION METHOD, DEVICE AND SYSTEM

CROSS REFERENCE TO RELATED APPLICATIONS

This application is a continuation of U.S. patent application Ser. No. 13/917,923, filed on Jun. 14, 2013, which is a continuation of U.S. patent application Ser No. 12/538,438, filed on Aug. 10, 2009, now U.S. Pat. No. 8,489,711, which is a continuation of International Patent Application No. PCT/CN2007/070978, filed on Oct. 29, 2007, which claims priority to Chinese Patent Application No. 200710080120.7, filed on Feb. 12, 2007. All of the afore-mentioned patent applications are hereby incorporated by reference in their entireties.

FIELD OF THE INVENTION

The present invention relates to service distribution technologies in a communication network and in particular to a service distribution method, device and system.

BACKGROUND OF THE INVENTION

Existing broadband access technologies are primarily divided into copper wire access and optical access technologies. An access network implemented with the optical access technology is referred to as an Optical Access Network (OAN). The Passive Optical Network (PON) technology is an optical access technology for point-to-multipoint transport.

FIG. 1 is a schematic diagram of a networking structure of an existing PON system including an Optical Line Terminal (OLT), an Optical Distributed Network (ODN) and an Optical Network Unit (ONU).

Specifically, the OLT connected with at least one ODN provides an OAN with a Serial Network Interface (SNI).

The ODN is a passive light splitter adapted to transmit downlink data from the OLT to each ONU by light splitting and to transmit uplink data from each ONU to the OLT.

The ONU connected with the ODN provides the OAN with a User Network Interface (UNI), and if the ONU also functions as a user port, e.g., an Ethernet user port or a Plain Old Telephone Service (POTS), then the ONU can be referred to as an Optical Network Termination (ONT). The ONU and the ONT will be collectively referred to as the ONT hereinafter unless stated otherwise.

An ONU Management Control Interface (OMCI) refers to a mechanism for transporting information between an OLT and an ONT; by configuring a transmission channel through the OMCI, the ONT can be managed and controlled by the OLT. In the OMCI mechanism, various data for management of the ONT by the OLT is extracted as Protocol-Independent Management Information Base (MIB), and a basic information unit of a MIB is a Management Entity (ME).

Service distribution refers to an automatic configuration procedure in which an operator initially allocates a number to a user and finally refreshes a service of the user through a service distribution system including an Order System, an Operation Support System (OSS), an Equipment Management System (EMS) and a service equipment. Currently, there are numerous PON technologies, e.g., a Giga-bit Passive Optical Network (GPON), a Broad Band PON (BPON), etc., and the service distribution procedure in the PON system based upon the OMCI mechanism will be described below by way of an example of the GPON system.

Firstly, the operator investigates a network to determine physical deployment, installs an equipment and performs corresponding basic configuration in the EMS; then, when a user registers for a service at a business hall, service information of the user is recorded by the OSS system and the EMS is instructed to generate data related to the service information of the user; and finally, the EMS sends the data to the service equipment which accomplishes specific parameter configuration. Except that the configuration at the reception desk of the business hall needs manual intervention, subsequent processes in the procedure are automatically implemented jointly by the equipments of OSS, EMS, OLT, ONT, etc., and this automatically implemented procedure is referred to as service distribution.

The OMCI management entity has been functionally improved in the G.984.4 standard and subsequent supplementary versions established for GPON technology by the International Telecommunication Union, Telecommunication sector (ITU-T) so that the OMCI can manage value-added services of Voice over IP (VoIP), Circuit Emulation Service (CES), Multimedia over Coax Association (MoCA), etc. A service distribution method for these value-added services is as illustrated in FIG. 2. Referring to FIG. 2, when a user registers for a service, e.g., the VoIP service, the OSS sends a message of adding the VoIP service for the user to an EMS, the EMS sends all configurations related to the VoIP service by MIB messages of the Simple Network Management Protocol (SNMP) in sequence to an ONT, then an OLT converts these MIB messages into an OMCI management entity message and sends the message to the ONT, and finally the ONT configures specific hardware devices in sequence in the ONT according to the OMCI management entity message.

The inventors of this application have identified during making the invention the following drawbacks in the above technical solution:

1. There are numerous types of terminals, but only management entities for services such as VoIP, CES, MoCA, etc., have been prescribed in the standard. In the case of a newly added service for which a service distribution is to be performed, an OMCI management entity has to be extended correspondingly for the new service, which may incur a heavy development workload due to the complexity of the OMCI management entity.

2. When a new service has been added and the OMCI management entity has been extended correspondingly for the new service, a corresponding OMCI management entity message has to be added, which brings increased difficulty in intercommunication between the equipments of OLT and ONT.

3. Any modification of the OMCI management entity involves modifications of numerous parts, as EMS, OLT, ONT, etc., which may be adverse to an extension thereof.

Consequently, the above existing service distribution solution has poor extendibility.

SUMMARY OF THE INVENTION

A service distribution method according to an embodiment of the invention provides a service distribution method with good extendibility.

A service distribution system according to an embodiment of the invention provides a service distribution system with good extendibility.

A management system according to an embodiment of the invention can provide a service distribution with good extendibility.

In order to attain the object, a technical solution of an embodiment of the invention are realized as follows:

A method for accomplishing a service configuration for an Optical Network Terminal (ONT) in a Passive Optical Network, comprising:

receiving, at the ONT, a configuration file in a format of eXtensible Markup Language (XML) from an Optical Line Terminal (OLT) wherein the configuration file in the format of XML is associated with service information of a user;

parsing, at the ONT, the configuration file in the format of XML to obtain configuration data corresponding to the service information of the user; and configuring the ONT according to the configuration data.

An Optical Network Terminal (ONT), wherein the ONT is configured to receive a configuration file in a format of eXtensible Markup Language (XML) from an Optical Line Terminal (OLT), wherein the configuration file in the format of XML is associated with service information of a user; parse the configuration file in the format of XML to obtain configuration data corresponding to the service information of the user; and configure the ONT according to the configuration data.

A Passive Optical Network system, comprising: an Optical Line Terminal (OLT) and at least one Optical Network Terminal (ONT); wherein the OLT is configured to receive a configuration file in the format of eXtensible Markup Language (XML) and send the configuration file in the format of XML to the ONU;

wherein the at least one ONT is configured to receive the configuration file in a format of XML from the OLT, wherein the configuration file in the format of XML is associated with service information of a user; parse the configuration file in the format of XML to obtain configuration data corresponding to the service information of the user; and configure the ONT according to the configuration data.

As can be seen from the above technical solution, in the solution according to the embodiment of the invention, firstly the management system generates a corresponding configuration file from the service information of a user and then sends the configuration file through an OLT to an ONT corresponding to the user, and finally the ONT performs corresponding configuration in accordance with the configuration file, thereby accomplishing service configuration for the ONT by way of the configuration file. Since the configuration file can be extended flexibly, the service configuration information in the configuration file can also be extended flexibly.

Furthermore, in the above technical solutions, the OLT can simply transport the configuration file from the management system to the ONT of the user without perceiving the configuration, so the coupling between the management system, the OLT and the ONT can be reduced, thereby also resulting in enhanced extendibility of a service.

DETAILED DESCRIPTION OF THE INVENTION

The invention will be further described in details below with reference to the drawings and the embodiments to make the object, technical solution and advantages of the invention more apparent.

Figure 1:
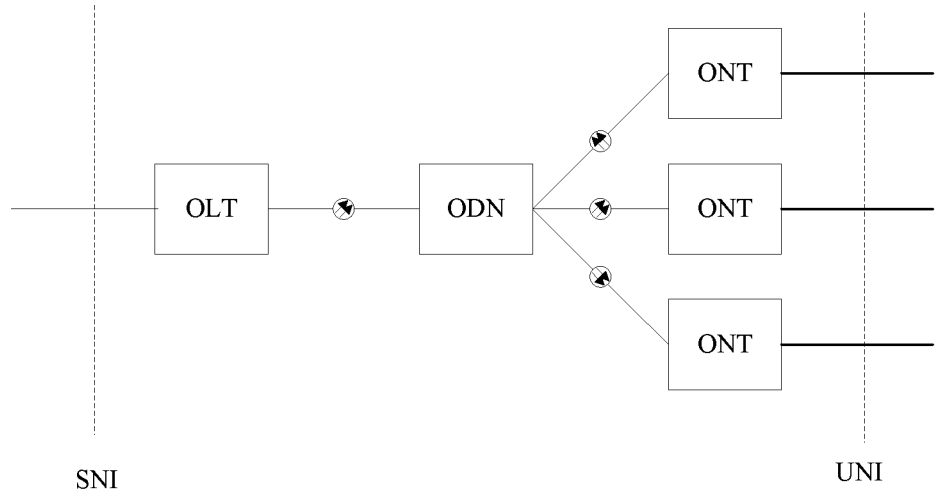
FIG. 1 is a schematic diagram of a networking structure of an existing PON system.
Figure 2:
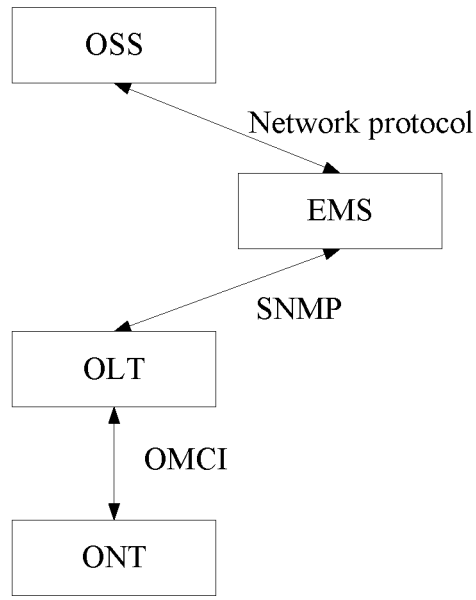
FIG. 2 is a schematic diagram of a flow of an existing value-added service distribution method.
Figure 3:
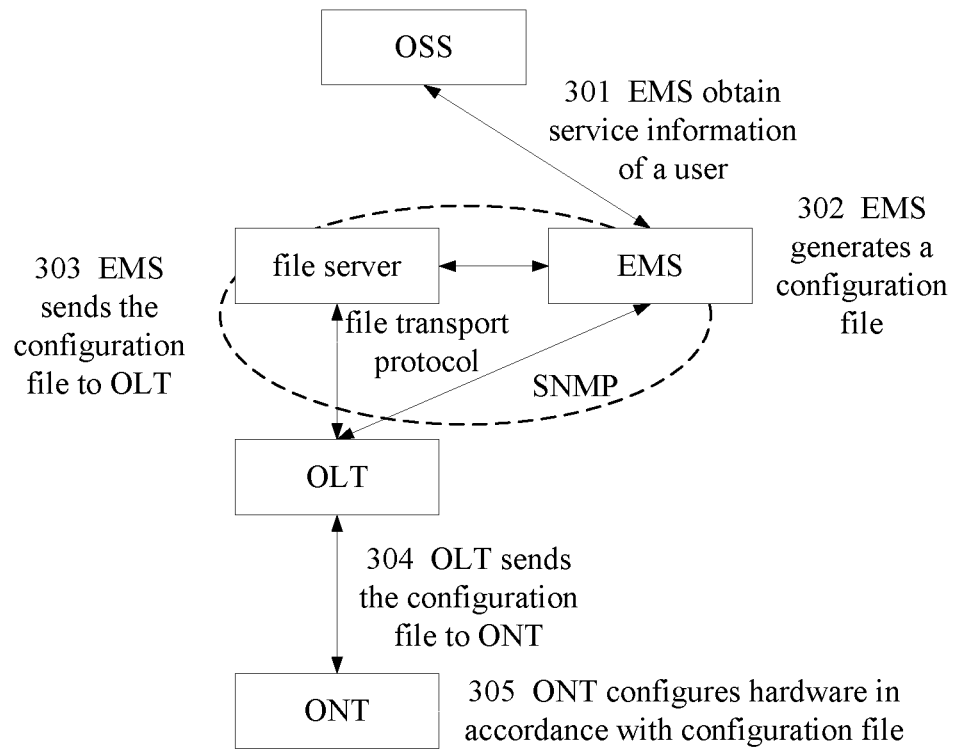
FIG. 3 is a schematic diagram of a flow of a service distribution method according to an embodiment of the invention.

FIG. 3 is a schematic diagram of a service distribution method according to an embodiment of the invention. Referring to FIG. 3, the method includes the following steps:

In the step 301, the EMS obtains service information of a user.

In this step, the EMS may obtain the service information of the user from the OSS, from information input to the EMS by a network administrator or in any other feasible way in the prior art.

In the prior art, the EMS can obtain the service information of the user from the OSS based upon a network protocol of TL1, Common Object Request Broker Architecture (CORBA), etc.

In the step 302, the EMS generates a corresponding configuration file from the service information of the user.

In this step, in order to facilitate rapid generation of the configuration file for the user, common configuration file templates corresponding to various ONT types can be generated in the EMS according to the ONT types and some common configuration information can be set in these common configuration file templates in advance. Thus, when the user registers for a service, the OSS system or the network administrator can firstly determine the ONT type of the user and then send only personalized configuration information corresponding to the user as the service information of the user to the EMS, and the EMS sets the personalized configuration information of the user in the common configuration file template corresponding to the ONT type of the user and generates the configuration file corresponding to the service information of the user.

Here, the common configuration information refers to general configuration information common to the same category of users/ONTs, and personalized configuration information is a concept with respect to common configuration information, e.g., a phone number, a routing manner, etc., of the user, which are configuration information specific to a user or an ONT.

In this step, the configuration file generated by the EMS can be in a format of currently popular eXtensible Markup Language (XML) or in another format, e.g., a text file (TXT) format or another self-defined format, provided that the ONT can normally parse the file to obtain configuration data upon receiving the configuration file.

In this step, the configuration file generated by the EMS can be stored in the EMS or stored by the EMS into a file server.

Here, the file server may be a file server based upon the File Transport Protocol (FTP) or a server based upon the Trivial File Transfer Protocol (TFTP), the SSH File Transfer Protocol (FTPS) or other file transport protocols.

In the step 303, the EMS sends the configuration file to the OLT.

In this step, the OLT sends the type of the ONT and the identifier (ID) of the user to the EMS when detecting that the ONT is online, and the EMS determines a configuration file to be sent in accordance with the type of the ONT and the ID of the user. The embodiment provides two methods for sending the configuration file to the OLT after the EMS determines the configuration file to be sent.

In the first method, the EMS sends the configuration file directly to the OLT.

In the second method, in the step 302, the EMS stores the generated configuration file in the file server and notifies the OLT about the determined configuration file after determining the configuration file to be sent, the OLT makes a request to the file server for downloading the configuration file, and then the file server sends the configuration file which the OLT requests to download to the OLT.

In this step, the information of the type of the ONT, the ID of the user, etc., may be interacted between the EMS and the OLT based on a transportation means in a protocol of SNMP, Telnet, etc., and the configuration files may be transported between the EMS and the OLT or between the file server and the OLT by a transportation means in a protocol of FTP, TFTP or FTPS or in other file transport protocols.

In the step 304, the OLT sends the configuration file to the ONT.

In this step, the OLT may send the configuration file to the corresponding ONT through an OMCI file loading channel, details of which can be found in a data loading flow of OMCI in the prior art and will not be described here.

In the step 305, the ONT performs corresponding configuration for hardware in the ONT in accordance with the configuration file.

In this step, the ONT parses the configuration file from the OLT to obtain the configuration data corresponding to the service information of the user and performs corresponding configuration for hardware in the ONT in accordance with the configuration data.

Thus, the service distribution flow according to the embodiment is finished.

The service distribution system is described below by way of a system embodiment of the invention.

Figure 4:
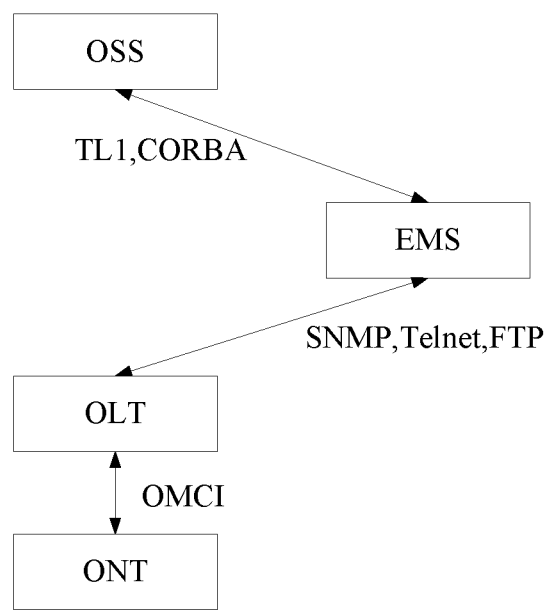
FIG. 4 is a schematic diagram of a structure of components in a service distribution system according to an embodiment of the invention.

FIG. 4 is a schematic diagram of a structure of components in the service distribution system according to an embodiment of the invention. Referring to FIG. 4, the system includes an OSS, an EMS, an OLT and an ONT.

Particularly, the EMS is adapted to generate a corresponding configuration file from service information of a user and to send the configuration file through the OLT to the ONT corresponding to the user.

The OLT is adapted to send the received configuration file to the ONT corresponding to the user.

The ONT is adapted to perform corresponding configuration for hardware in the ONT in accordance with the configuration file.

In the system illustrated in FIG. 4, the EMS is further adapted to set a common configuration file template containing common configuration information, which corresponds to the type of the ONT, to set the personalized configuration information of the user as the service information of the user in the common configuration file template corresponding to the ONT type of the user and to generate a configuration file corresponding to the service information of the user. Here, the EMS can obtain the service information of the user from the OSS based upon a network protocol of TL1, CORBA, etc., from information input to the EMS by a network administrator or in any other feasible way in the prior art.

In the system illustrated in FIG. 4, the OLT can be adapted to detect the ONT and to send the type of the ONT and the ID of the user to the EMS when detecting that the ONT is online, and the EMS determines a configuration file to be sent in accordance with the type of the ONT and the ID of the user. The embodiment provides two methods for sending the configuration file to the OLT after the EMS determines the configuration file to be sent.

In the first method, the EMS sends the configuration file directly to the OLT. In this method, the configuration file may be transported between the EMS and the OLT by a transportation means in a protocol of FTP, TFTP, FTPS or in other file transport protocols.

In the second method, the system illustrated in FIG. 4 further includes a file server, so that the EMS stores the generated configuration file in the file server and notifies the OLT after determining the configuration file to be sent, the OLT initiates to the file server a file download request for downloading the configuration file, and then the file server sends the configuration file requested by the OLT to the OLT. In this method, the configuration file may be transported between the file server and the OLT by a transportation means in a protocol of FTP, TFTP, FTPS or in other file transport protocols.

The OLT can send the configuration file to the corresponding ONT through an OMCI file loading channel upon receiving the configuration file.

In the system illustrated in FIG. 4, the EMS may be adapted to generate the configuration file in a format of XML, TXT or other formats.

The ONT is adapted to parse the configuration file in the format of XML, TXT or in other formats to obtain configuration data corresponding to the service information of the user and to perform corresponding configuration for hardware in the ONT in accordance with the obtained configuration data.

As can be seen from the above embodiments, in the technical solutions of the embodiments of the invention, firstly the EMS generates the corresponding configuration file from the service information of the user and then sends the configuration file through the OLT to the ONT corresponding to the user, and finally the ONT performs corresponding configuration for hardware in the ONT in accordance with the configuration file, thereby accomplishing service configuration for the ONT by way of the configuration file. Since the configuration file may be extended flexibly, the service configuration information in the configuration file may also be extended flexibly.

Furthermore, since in the above technical solutions the OLT can simply transport the configuration file from the EMS to the ONT without perceiving the configuration, so the coupling between the equipments of EMS, OLT and ONT may be reduced, thereby also resulting in enhanced extendibility of a service.

Additionally, in order to facilitate rapid generation of the configuration file for the user, in the embodiment, common configuration file templates corresponding to different ONT types are set in the EMS, and thus the OSS or the network administrator can simply send the personalized configuration information of the user to the EMS, so that the EMS can generate the configuration file from the personalized configuration information.

The foregoing descriptions are merely illustrative of the preferred embodiments of the invention but not intended to limit the scope of the invention. Any modifications, equivalents and adaptations made without departing from the spirit of the invention shall come into the scope of the claims appended to the invention.

What is claimed is:

1. A method, comprising:
   receiving, at an Optical Network Terminal (ONT), a configuration file comprising common configuration information and personalized configuration information from an Optical Line Terminal (OLT),
wherein the personalized configuration information comprises an ID of a specific user, and wherein the common configuration information is general configuration information in a common configuration file template corresponding to a type of the ONT, the type of the ONT indicates which Passive Optical Network (PON) technology the ONT is associated with, the common configuration file template is associated with the type of the ONT and is one of a plurality of common configuration file templates, each of the plurality of common configuration file templates is associated with a different type of ONT;
parsing, at the ONT, the configuration file to obtain configuration information of the ONT; and
configuring the ONT according to the configuration information.

2. The method according to claim 1, wherein the configuration file received is in an extensible Markup Language (XML) format.

3. The method according to claim 1, the method further comprises:
receiving, at the ONT, the configuration file through an optical network unit management control interface (OMCI) channel.

4. The method according to claim 1, wherein the configuration file is associated with the type of the ONT and an identifier of an user.

5. An optical network terminal (ONT) comprising:
a processor; and
a non-transitory memory coupled to the processor and storing program instructions which, when executed by the processor, cause the processor to perform operations comprising:
receiving a configuration file comprising common configuration information and personalized configuration information from an Optical Line Terminal (OLT),
wherein the personalized configuration information comprises an ID of a specific user, and wherein the common configuration information is general configuration information in a common configuration file template corresponding to a type of the ONT, the type of the ONT indicates which Passive Optical Network (PON) technology the ONT is associated with, the common configuration file template is associated with the type of the ONT and is one of a plurality of common configuration file templates, each of the plurality of common configuration file templates is associated with a different type of ONT;
parsing the configuration file to obtain configuration information of the ONT; and
configuring the ONT according to the configuration information.

6. The ONT according to claim 5, the operations further comprise:
receiving the configuration file through an optical network unit management control interface (OMCI) channel.

7. The ONT according to claim 5, wherein the configuration file received is in an extensible Markup Language (XML) format.

8. The ONT according to claim 5, wherein the configuration file is associated with the type of the ONT and an identifier of an user.

* * * * *